(12) United States Patent
Bigall

(10) Patent No.: US 10,154,004 B2
(45) Date of Patent: *Dec. 11, 2018

(54) DHCP COMMUNICATIONS CONFIGURATION SYSTEM

(71) Applicant: Dell Products L.P., Round Rock, TX (US)

(72) Inventor: Evan John Bigall, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/809,956

(22) Filed: Jul. 27, 2015

(65) Prior Publication Data

US 2015/0334084 A1 Nov. 19, 2015

Related U.S. Application Data

(63) Continuation of application No. 13/587,223, filed on Aug. 16, 2012, now Pat. No. 9,106,707.

(51) Int. Cl.
*H04L 29/12* (2006.01)
*H04L 12/24* (2006.01)

(52) U.S. Cl.
CPC ...... *H04L 61/2015* (2013.01); *H04L 41/0803* (2013.01)

(58) Field of Classification Search
CPC .................. H04L 61/2015; H04L 41/0803
USPC ......................................... 709/220
See application file for complete search history.

(56) References Cited

U.S. PATENT DOCUMENTS

| 6,865,192 | B1 | 3/2005 | Barrow | |
| 7,313,606 | B2* | 12/2007 | Donahue | H04L 41/0806 709/220 |
| 7,571,308 | B1 | 8/2009 | Bahl et al. | |
| 7,600,003 | B1* | 10/2009 | Okmianski | H04L 12/2801 709/217 |
| 7,720,002 | B1* | 5/2010 | Beser | H04L 29/12235 370/254 |
| 8,046,577 | B2 | 10/2011 | Henry et al. | |
| 8,977,763 | B1* | 3/2015 | Brown | H04L 65/4076 709/231 |

(Continued)

OTHER PUBLICATIONS

R. Droms and W. Arbaugh; "Authentication for DHCP Messages;" Jun. 2001; Cisco Systems; University of Maryland; pp. 1-17; http://tools.ietf.org/html/rfc3118.

*Primary Examiner* — Joseph L Greene
(74) *Attorney, Agent, or Firm* — Haynes and Boone, LLP

(57) ABSTRACT

A Dynamic Host Configuration Protocol (DHCP) communications configuration system includes a client information handling system (IHS) coupled to a controller over a network. The client IHS creates a plurality of DHCP discover messages that include capability data that describes at least one hardware resource on the client IHS, and sends the plurality of DHCP discover messages over the network. The controller receives the plurality of DHCP discover messages and processes the capability data to determine configuration data for the client IHS, creates a plurality of DHCP offer messages including the configuration data for the client IHS, and sends the plurality of DHCP offer messages over the network to the client IHS. The client IHS then uses the configuration data to configure the client IHS.

18 Claims, 5 Drawing Sheets

(56) References Cited

U.S. PATENT DOCUMENTS

| | | | | |
|---|---|---|---|---|
| 9,178,857 B2* | 11/2015 | Counterman | ........... | H04L 63/08 |
| 2002/0138614 A1* | 9/2002 | Hall | ................. | H04L 29/12009 |
| | | | | 709/225 |
| 2005/0091349 A1* | 4/2005 | Scheibli | .................... | G06F 8/61 |
| | | | | 709/222 |
| 2007/0180086 A1 | 8/2007 | Fang et al. | | |
| 2007/0203999 A1* | 8/2007 | Townsley | ............ | H04L 29/1282 |
| | | | | 709/207 |
| 2008/0300059 A1 | 12/2008 | Adiraju et al. | | |
| 2009/0141717 A1 | 6/2009 | Cabeca et al. | | |
| 2010/0280961 A1* | 11/2010 | Thyni | ................. | G06Q 50/188 |
| | | | | 705/80 |
| 2014/0052830 A1 | 2/2014 | Bigall | | |

* cited by examiner

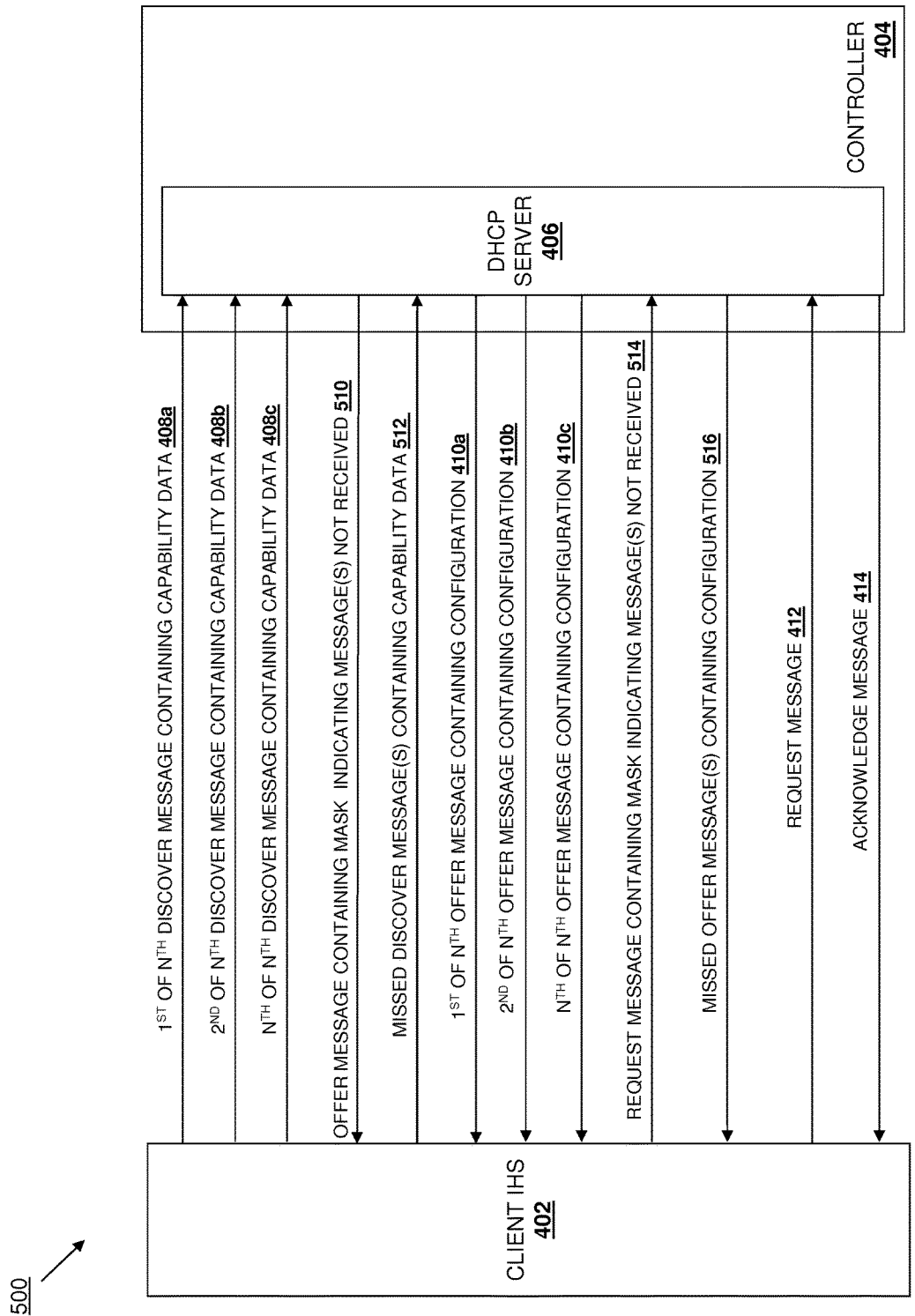

DHCP COMMUNICATIONS CONFIGURATION SYSTEM

CROSS-REFERENCE TO RELATED APPLICATIONS

This application is a Continuation of U.S. patent application Ser. No. 13/587,223 filed on Aug. 16, 2012, entitled "DHCP Communications Configuration System," the disclosure of which is incorporated herein by reference.

BACKGROUND

The present disclosure relates generally to information handling systems, and more particularly to the configuration of information handling systems using Dynamic Host Configuration Protocol (DHCP) communications.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHS's such as, for example, IHS's operated using the Advanced Infrastructure Manager (AIM) from Dell, Inc., must be configured with a variety of information in order to allow the IHS to operate properly. For example, typically an AIM server must establish a connection with a controller, that controller's identity must then be confirmed, and then configuration information must be exchanged between the controller and the AIM server so that the image on the AIM server can be configured (e.g., the controller may determine a number of Network Interface Controllers (NICs) in the AIM server for assignment.) One of skill in the art will recognize that such configuration raises a number of issues because it requires communication over a network, and prior to configuration the AIM server is unable to perform many of the necessary configuration operations without first having an Internet Protocol (IP) address.

Traditionally, the configuration discussed above is enabled by using a conventional Dynamic Host Configuration Protocol (DHCP) server to provide for network configuration of the NICs in the AIM server so that the AIM server can then contact the controller, confirm the identity of the controller, and then receive the AIM server configuration information. However, this solution suffers from a number of deficiencies. For example, such a solution can results in multiple, independent, per-NIC clients operating simultaneously on boot, and those clients will often contend for global resources (e.g., the routing table.) Also, such a solution may allow the network configuration to persist across reboots, which leads to canonical problems, particularly in situations where the IHS's do not have identical hardware. For example, an image that runs as expected on a first IHS may not run as expected on a second IHS due to devices (e.g., NICs) in the second IHS being assigned incorrect addresses (e.g., addresses that allowed the NICs in the first IHS to operate as expected) or addresses that do not even exist.

Accordingly, it would be desirable to provide an improved IHS configuration system and method.

SUMMARY

According to one embodiment, a Dynamic Host Configuration Protocol (DHCP) communications configuration system includes a network; a client information handling system (IHS) that is coupled to the network and that is operable to create a plurality of DHCP discover messages that include capability data that describes at least one hardware resource on the client IHS, and send the plurality of DHCP discover messages over the network; a controller that is coupled to the network and that is operable to receive the plurality of DHCP discover messages including the capability data, process the capability data to determine configuration data for the client IHS, create a plurality of DHCP offer messages including the configuration data, and send the plurality of DHCP offer messages over the network to the client IHS; and wherein the client IHS is further operable to use the configuration data to configure the client IHS.

BRIEF DESCRIPTION OF THE DRAWINGS

FIG. 5 is a schematic view illustrating a DHCP communications configuration system being used to configure an IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
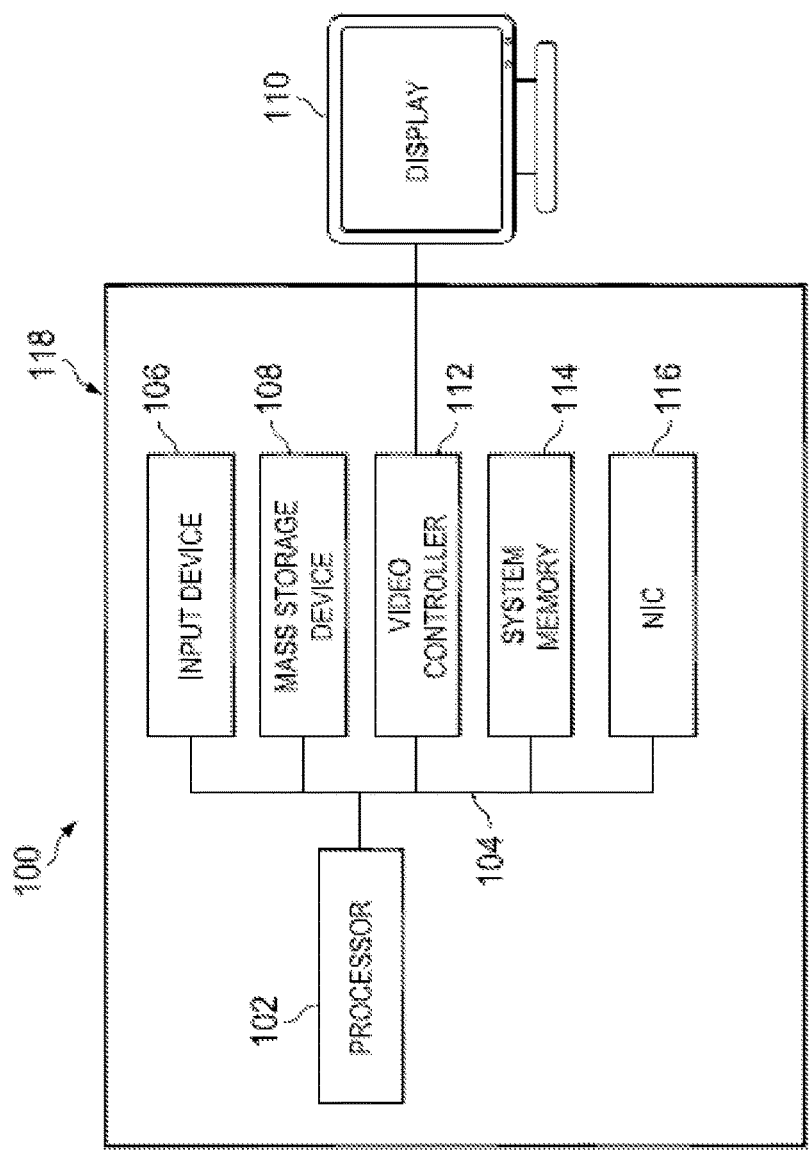
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. One or more network interface controllers (NICs) 116 are coupled to processor 102. In an embodiment, a chassis 118 houses some or all of the components of IHS 100. It should be understood that other buses and intermediate circuits can be deployed between the components described above and processor 102 to facilitate interconnection between the components and the processor 102.

Figure 2:
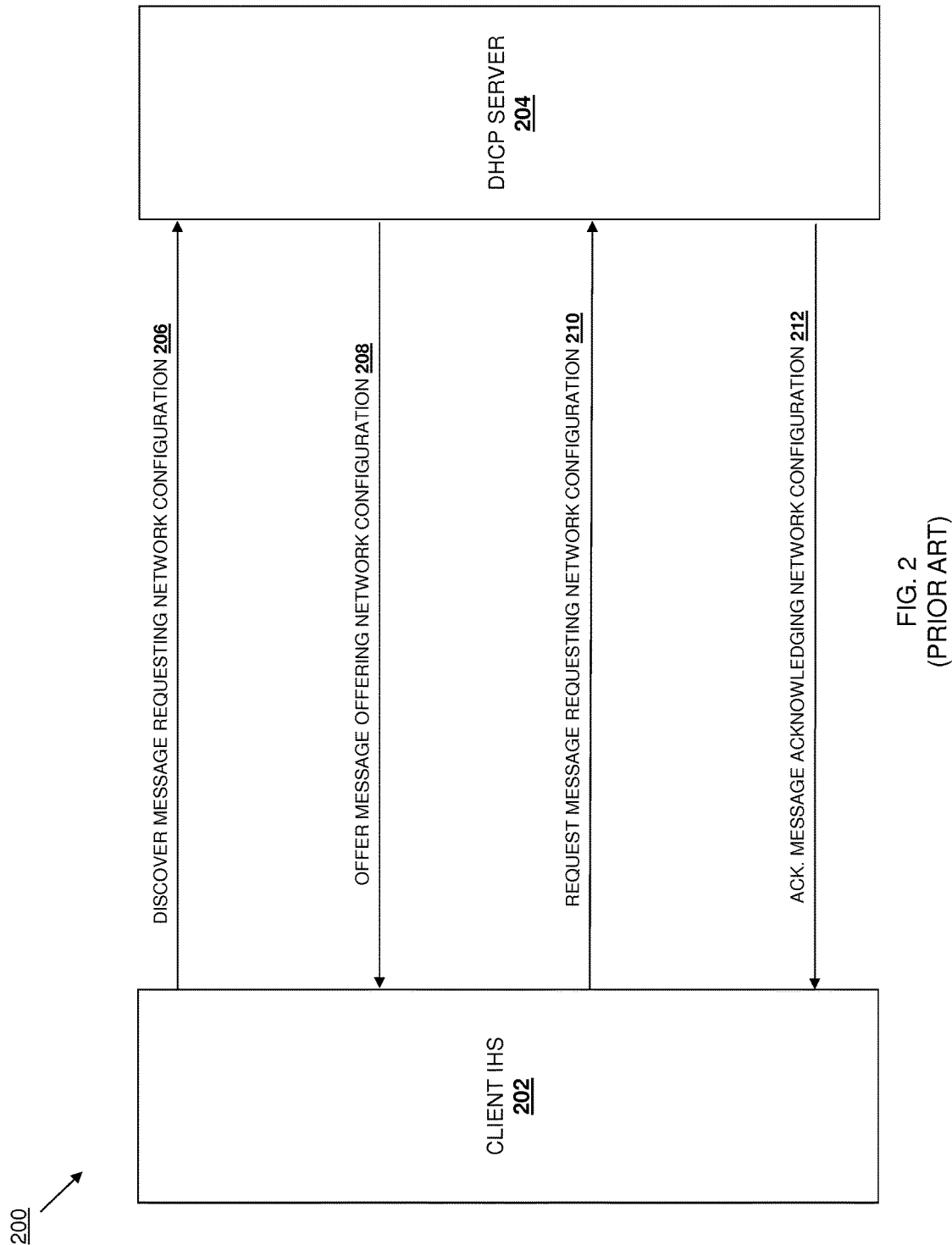
FIG. 2 is a schematic view illustrating an embodiment of a prior art DHCP communication system.

Referring now to FIG. 2, a conventional DHCP communication is illustrated. As is known in the art, computers connected to IP networks must have their NICs configured before the computer can communicate normally over the network. DHCP allows a computer to obtain its network configuration over the network before that computer has been configured to use the network. A brief description of conventional DHCP communication is provided below as an example.

FIG. 2 includes a client IHS 202 connected to a DHCP server 204, and one of skill in the art will recognize that a Network Interface Card (NIC) in the client IHS 202, not illustrated, is used to communicate with the DHCP server 204 (e.g., using a conventional DHCP client provided on the NIC) to request and receive network configuration information, as detailed below. In an embodiment, the client IHS 202 and/or the DHCP server 204 may be the IHS 100 or include components of the IHS 100, described above with reference to FIG. 1.

A conventional DHCP network communication begins with the client IHS 202 sending a discover message requesting a network configuration 206. For example, the discover message may include the following information:
type: DISCOVER
request: true
xid: afcd630
broadcast: true
ciaddr: 0.0.0.0
yiaddr: 0.0.0.0
siaddr: 0.0.0.0
giaddr: 0.0.0.0
client mac: 00-1D-09-FC-D6-30
sname:
file:
options:
   DHCP message type: DISCOVER
   Parameter request list:
   Subnet Mask
   Domain Name Servers
   Vendor specific information
   Server identifier
   Class-identifier
   Bootfile name
   TFTP Server IP address
   Maximum DHCP message size: 1260
   Client Machine UUID: 44454c4c-3800-1038-8050-b3c04f4d4731
   Client System Architecture Type:
   Intel x86PC
   Network Interface Identifier: UNDI 2.1
   Class-identifier: PXEClient:Arch:00000:UNDI:002001

As is known in the art, upon receiving the discover message requesting a network configuration 206, the DHCP server 204 responds with an offer message offering a network configuration 208. For example, the offer message may include the following information:
type: OFFER
request: false
xid: afcd630
broadcast: true
ciaddr: 0.0.0.0
yiaddr: 192.168.97.13
siaddr: 192.168.96.10
giaddr: 0.0.0.0
client mac: 00-1D-09-FC-D6-30
sname: ScalentController
file: /pxelinux.0
options:
   DHCP message type: OFFER
   Server identifier: 192.168.96.10
   Subnet Mask: 255.255.240.0
   Default gateway: 192.168.96.1
   Domain Name Servers: 10.128.40.50 10.128.40.79
   Domain Name: scalent.dell.com As is also know in the art, upon receiving the offer message offering a network configuration 208, the client IHS 202 responds with a request message requesting a network configuration 210. For example, the request message may include the following information:
type: REQUEST
request: true
xid: afcd630
broadcast: true
ciaddr: 0.0.0.0
yiaddr: 0.0.0.0
siaddr: 0.0.0.0
giaddr: 0.0.0.0
client mac: 00-1D-09-FC-D6-30
sname:
file:
options:
   DHCP message type: REQUEST
   Requested IP Address: 192.168.97.13
   Parameter request list:
   Subnet Mask
   Domain Name Servers
   Vendor specific information
   Server identifier
   Class-identifier
   Bootfile name
   TFTP Server IP address
   Maximum DHCP message size: 1260
   Server identifier: 192.168.96.10
   Client Machine UUID: 44454c4c-3800-1038-8050-b3c04f4d4731

Client System Architecture Type:
Intel x86PC
Network Interface Identifier: UNDI 2.1
Class-identifier: PXEClient:Arch:00000:UNDI:002001

As is also know in the art, upon receiving the request message requesting a network configuration 210, the DHCP server 204 responds with an acknowledge message acknowledging the network configuration 212. For example, the acknowledge message may include the following information:
type: ACK
request: false
xid: afcd630
broadcast: true
ciaddr: 0.0.0.0
yiaddr: 192.168.97.13
siaddr: 192.168.96.10
giaddr: 0.0.0.0
client mac: 00-1D-09-FC-D6-30 m
sname: ScalentController
file: /pxelinux.0
options:
   DHCP message type: ACK
   IP address lease time: 86400
   Server identifier: 192.168.96.10
   Subnet Mask: 255.255.240.0
   Default gateway: 192.168.96.1
   Domain Name Servers: 10.128.40.50 10.128.40.79
   Domain Name: scalent.dell.com
   Message: PR.123273.1 on 388PMG1

Such conventional DHCP network communications operate on single interfaces (DHCP provides for information transfer between a single client NIC and the DHCP server) that exchange small amounts of data, and do not include any security or authentication. While DHCP is designed to be extensible by adding vendor defined classes of options, those options are limited in size to 255 bytes.

In a modern virtualized data center, the configuration of client IHS's is more complicated than described above for the client IHS 202 using the conventional DHCP communications. Client IHS's may include multiple NICs connected to different networks. Some of those NIC connections may be to managed (e.g., editable configuration) switches, while some of those NIC connections may be to unmanaged (e.g., fixed configuration) switches. In addition to connections to IP networks, there may also be connections to Fibre channel (FC), Fibre Channel over Ethernet (FcoE), InfinBand, and/or other network fabrics. Many modern client IHS's also include Converged Network Adapters (CNAs) which merge the functionality of traditional NICs and Host Bus Adapters (HBAs) used to connect to various storage networks, and those CNAs often require additional complex configuration for partitioning their different roles and the Quality of Service (QoS) relationships between them.

Furthermore, the use of DHCP communications for such client IHS's is limited to using a conventional Dynamic Host Configuration Protocol (DHCP) server to provide network configuration for the NIC in the client IHS so that the client IHS can then use the NIC to contact a controller, confirm the identity of the controller, and then receive client IHS configuration information from the controller. As discussed above, this can lead to several problems, including the network configuration persisting across reboots, which leads to canonical problems, particularly in situations where the IHS's do not have identical hardware. One example of this involves a first client IHS and a second client IHS that are each connected to two networks. In this example, the first client IHS uses its NIC1 to connect to the first network and its NIC2 to connect to the second network, while the second client IHS uses its NIC1 to connect to the second network and its NIC2 to connect to the first network (i.e., the NICs in the second client IHS are reversed—a common situation in data centers.) In such a situation, an image may run as expected on the first client IHS. However, when providing a network configuration for the second client IHS so that it may run that image, the DHCP server may attempt to assign an address to NIC1 that may be in use by NIC2 and vice versa, resulting in the image not running as expected on the second client IHS (i.e., because an address is not assignable until it is released by the NIC using it.)

Thus, in a modern data center the network and/or server configuration requires complicated information with interdependencies, and attempting configuration interface-by-interface introduces a variety of problems. It would be much more effective send the controller a comprehensive description of the client IHS, let that controller determine the entire and complete configuration for the client IHS, and then send that determined configuration to the client IHS, which allows the client IHS to develop a strategy to successfully apply the entire configuration (e.g., releasing addresses that are used by incorrect devices.) The present disclosure describes a system and method that uses DHCP communications to provide a general transport mechanism for messages that are larger and more complicated than those allowed in conventional DHCP communications, which allows a client IHS to completely describe itself and thus receive complete configuration information that enables configuration of the entire client IHS, as opposed to conventional DHCP communications that only provide for configuration of a single interface (the NIC) in the client IHS. Furthermore, the systems and methods of the present disclosure provide encryption for exchanged messages, as well as authentication of the client IHS and/or the controller.

Figure 3:
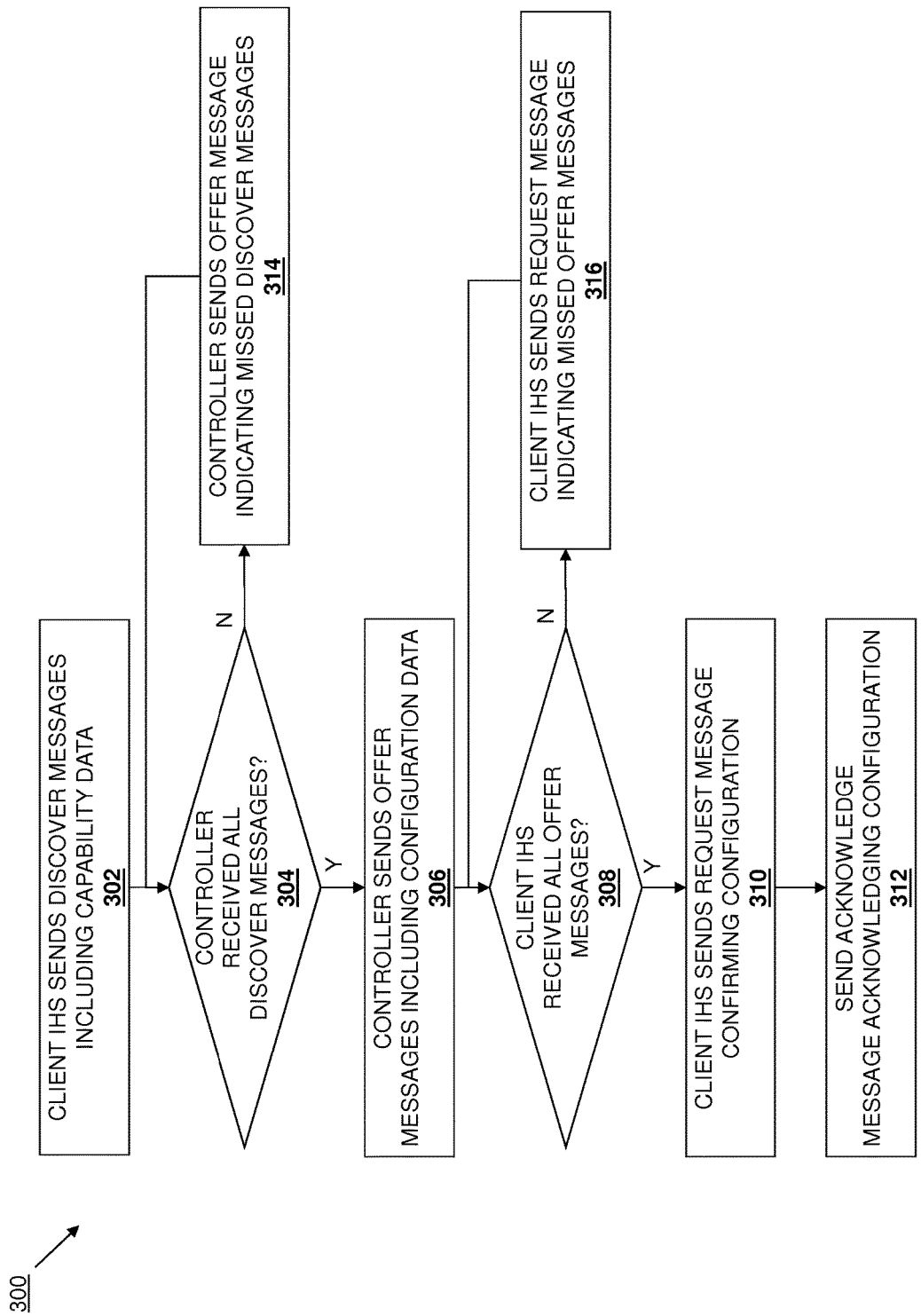
FIG. 3 is a flow chart illustrating an embodiment of a method for configuring an IHS using DHCP communications.
Figure 4:
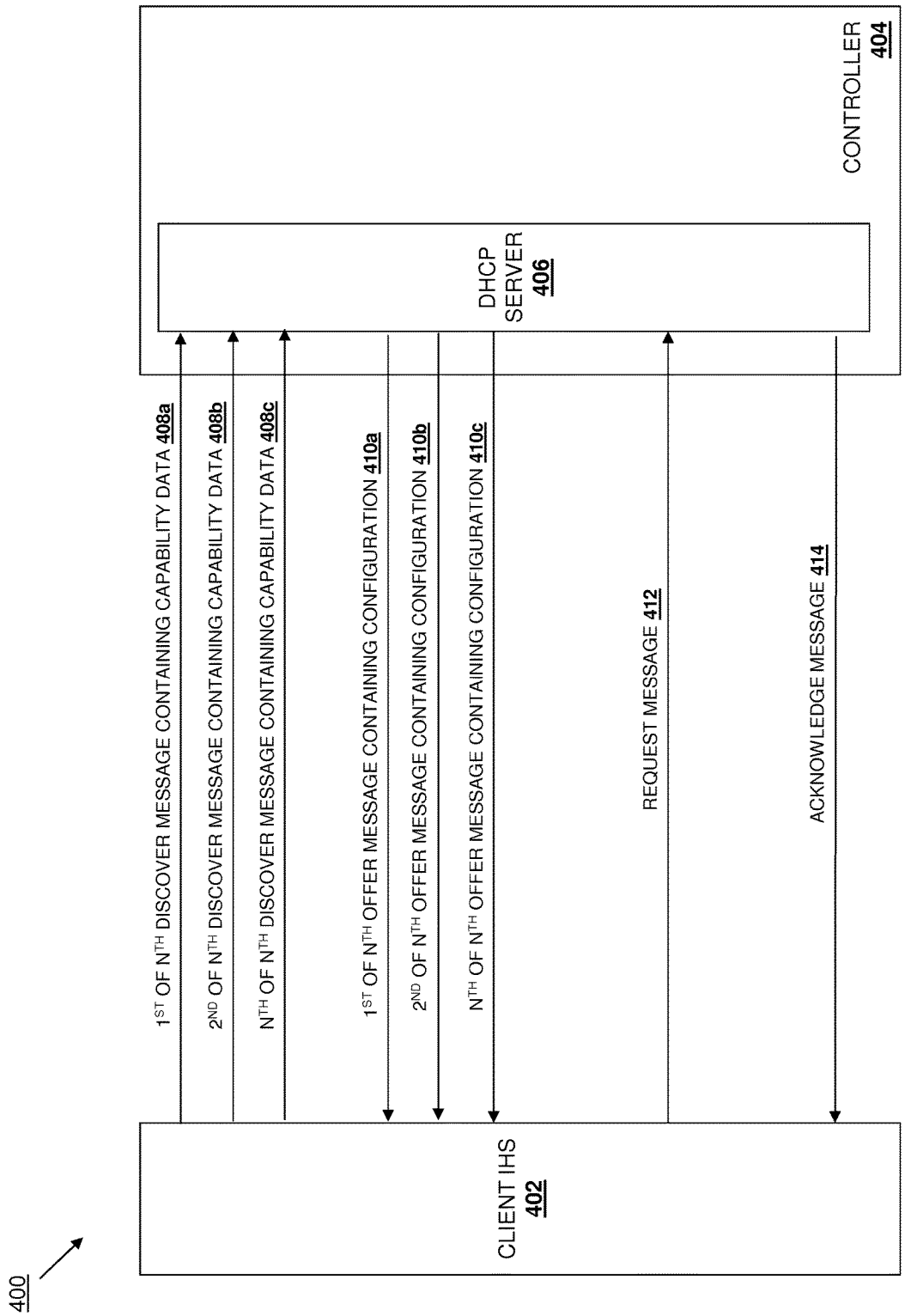
FIG. 4 is a schematic view illustrating a DHCP communications configuration system being used to configure an IHS.

Referring now to FIGS. 3, 4, and 5, systems 400 and 500 and a method 300 for configuring IHS's using DHCP communications are illustrated and described. The systems 400 (illustrated in FIG. 4) and 500 (illustrated in FIG. 5) includes a client IHS 402, a controller 404 that is coupled to the client IHS 402 through one or more networks, and a DHCP server 406 that is provided by the controller 404. The client IHS 402 includes one or more modified DHCP clients (e.g., relative to a conventional DHCP client) such as, for example, a modified DHCP client provided on each NIC in the client IHS 402. While the controller 404 is illustrated and described below as providing an integrated DHCP server 406, one of skill in the art will recognize that the controller 404 and the DHCP server 406 may be separate and discrete components without departing from the scope of the present disclosure. As discussed below, DHCP communications are used as a transport mechanism in the systems 400 and 500 of the present disclosure to allow the exchange of arbitrary messages between the client IHS 402 and the controller 404 such that the client IHS 402 may be completely configured. As such, a "tunnel" is provided through the DHCP server 406 that uses the DHCP transport mechanism, which is typically associated with relatively small amounts of single interface configuration data, for complete configuration data for the client IHS 402. As described more fully below, the "tunnel" provided through the DHCP server 406 allows for the exchange of relatively large capability and configuration messages by breaking them into pieces that can be transported using the traditional DHCP protocol. As also described below, FIG. 4 illustrates the method 300 of FIG. 3 in a situation where all messages initially sent according to the method 300 are received by the client IHS 402 and the controller 404, while FIG. 5 illustrates the method 300 of FIG. 3 in a situation where messages sent according to the method 300 are missed by the client IHS 402 and/or the controller 404.

Referring now to FIGS. 3 and 4, the method 300 begins at block 302 where the client IHS 402 sends discover messages including capability data. The client IHS 402 may include a non-transitory, computer-readable medium having instructions that, when executed by one or more processors, cause the one or more processors to determine a capability message that includes a plurality of capability data, and then create discover messages that include that capability data. The capability message may include capability data providing information about hardware resources available on the client IHS 402 and/or a variety of other capability data known in the art. For example, a capability message for the client IHS 402 may include the following capability data (provided in Extensible Markup Language (XML)):

```
<bc:bladeCapability
xmlns:bc=http://schemas.scalent.com/mi/bladeCapability/
bc:serialNumber="3H634F1"
bc:os="linux"
bc:osSubType="Red Hat Enterprise Linux Server release 5.4 (Tikanga)"
bc:osVersion="5.4 "
bc:osArch="x86_64"
bc:systemType="persona"
bc:dummynetboot="false"
bc:hwiscsiboot="false"
bc:hasAgent="false"
bc:vniLevel="auto"
bc:manufacturer="Dell Inc."
bc:model="PowerEdge SC1435"
bc:mgmntIPAddress="10.20.35.12"
bc:mgmntType="IPMI">
<bc:nics>
<bc:nic
bc:deviceName="eth2"
bc:macAddress="00-15-17-55-0A-E6"
bc:linkUp="true"
bc:vendor="intel"
bc:model="105e" />
<bc:nic
bc:deviceName="eth3"
bc:macAddress="00-15-17-55-0A-E7"
bc:linkUp="true"
bc:vendor="intel"
bc:model="105e" />
<bc:nic
bc:deviceName="bond0"
bc:macAddress="00-1D-09-11-87-32"
bc:linkUp="true" />
</bc:nics>
<bc:cpus
bc:sockets="1"
bc:cores="2"
bc:count="2"
bc:cpuFlags="SSE3,CMPXCHG16B,FPU,VME,DE,PSE,TSC,MSR,
PAE,MCE,CMPXCHG8B,APIC,SEP,MTRR,PGE,MCA,CMOV,PAT,
PSE36,CLFSH,MMX,FXSR,SSE,SSE2,HTT,LahfSahf,CmpLegacy,
SVM,AltMovCr8,SysCallSysRet,NX,MmxExt,FFXSR,RDTSCP,LM,
3DNowExt,3DNow"
bc:cpuFamily="Dual-Core AMD Opteron(tm) Processor 2210"
bc:cpuSpeedInMHz="1800"
bc:cpuType="x86_64" />
<bc:memoryMb>2048</bc:memoryMb>
</bc:bladeCapability>
```

In an embodiment, the capability message includes capability data that allows the client IHS 402 to completely describe itself to the controller 404 such that the controller 404 may determine and provide a complete configuration for the client IHS (i.e., rather than providing for the configuration of a single NIC interface that has conventionally be provided using DHCP communications.)

Because the capability message includes capability data that will typically exceed the allowable size for a single DHCP packet payload, multiple discover messages including capability data that provides portions of the capability data message are created by the client IHS 402. Because DHCP is a broadcast User Datagram Protocol (UDP), one of skill in the art will recognize that conventionally, fragmentation of DHCP packets is undesirable for several reasons. For example, when a fragment of a UDP packet is lost, the entire packet (all fragments) must be retransmitted. As DHCP is a broadcast protocol, such re-transmittal could cause an explosion of traffic on the network. Furthermore, as a practical matter, the nature of DHCP packets on most operating systems requires the DHCP packets to be hand constructed and given to a network stack at a point below where fragmentation and assembly typically occurs.

DHCP packets include a fixed length header followed by a list of variable length DHCP options. A DHCP option has three fields: tag, length, and value. A list of available DHCP options is included in RFC 2132, available at http://www.rfc-editor.org/rfc/rfc2132.txt. At block 302, the client IHS 402 of the present embodiment may use the DHCP options to store and transmit the capability data.

For example, DHCP option 43 (vendor specific information) allows the provision of encapsulated vendor specific information options. At block 302, the vender class identifier option in DHCP option 43 may be used to identify the client IHS 402, while capability data may be transmitted using additional encapsulated vendor specific information options. In an embodiment, at block 302, the client IHS 402 may create a first discover message by creating a first packet that includes a secret key that is used to encrypt the capability data and that may be encrypted with a public key of the controller 404, a secret key algorithm used by the secret key to encrypt the capability data, and a configuration version that indicates the version of the configuration message the client IHS 402 is expecting, with the secret key, the secret key algorithm, and the configuration version provided in the encapsulated vendor specific information options. Furthermore, the client IHS 402 may create the first discover message and subsequent discover messages by creating each of the first packet and subsequent packets that include sequence information ("x of y") that indicates the sequence of that packet, a specification of a number of data carrying options that allows space for the entire discover message to be allocated upon receipt of one of the packets, and the capability data. In an embodiment, the tag in the encapsulation may be used to identify the type of message (e.g., a tag of 12 could be used to indicate a compressed and encrypted capability message.)

In conventional DHCP communications, network configuration information is provided in the fixed length DHCP header. However, in an embodiment of the present disclosure, the DHCP headers may be ignored by the communications system, and all of the capability data may be provided in the message body. There are two fields in the DHCP header that the DHCP specification allows to be changed: the sname (64 bytes) and the file (128 bytes) fields. In one example, the overload option (tag 52) may be specified and capability data may be provided in the sname and file fields.

FIG. 4 illustrates an embodiment of the client IHS 402 sending the discover messages 408a, 408b, and 408c. As discussed above, modified DHCP clients in the client IHS 402 may create and send the discover messages through the "tunnel" in the DHCP server 406 to the controller 404. In an example, the capability message may include capability data that requires three discover messages to be created and sent to the controller 404, although one of skill in the art will recognize any number of discover messages may be used to send a capability message from the client IHS 402 to the controller 404, depending on the amount of capability data needed by the controller 404 to provide a complete configuration for the client IHS 402. In an experimental embodiment, the number of discover messages was limited to 255 packets, which on a typical local IP network allowing a maximum transmission unit (largest packet size) of 1500 bytes provides for approximately 1400 bytes of capability data per packet (i.e., minus the approximately 100 bytes used in the DHCP and UDP headers and space used to describe the DHCP options). The 255 packet limit provided for the transmission of approximately 238,680 bytes of capability data, which was found to be sufficient for even complicated systems, although future systems may require more space for capability messages and thus be provided with a higher packet limit.

After sending final discover message 208c, the modified DHCP client in the client IHS 402 waits for a response. The method 300 then proceeds to decision block 304 where it is determined whether all of the discover messages sent by the client IHS 402 were received by the controller 404. As discussed above, each of the discover messages sent in block 302 of the method 300 includes sequence information that identifies that discover message and the total number of discover messages being sent (e.g., the first discover message 408a could include sequence information "1 of 3", the second discover message 408b could include sequence information "2 of 3", and so on.) In an embodiment, the DHCP server 406 in the controller 404 receives the discover messages 408a, 408b, and 408c over the network from the client IHS 402 and determines whether all of the discover messages have been received by checking whether each discover message in the sequence has been received.

If at decision block 304 it is determined that all of the discover messages have been received, the method 300 proceeds to block 306 where the controller 404 sends offer messages including configuration data. In an embodiment, when the DHCP server 406 determines that all of the discover messages have been received, the DHCP server is operable to construct the capability message from the capability data in the discover messages, decrypt the capability message using the private key of the controller 404, and provide the capability message including the capability data to the controller 404. The controller 404 is operable to process the capability data in the capability message, determine a configuration message that includes configuration data for the client IHS 402, and provide that configuration data to the DHCP server 406. In an embodiment, the controller 404 may also be operable to configure manageable external resources such as network switches coupled to the client IHS 402 using the capability message. The offer messages may then be created by the DHCP server 406 using the configuration message including the configuration data in substantially the same manner as discussed above for the discover messages created by the client IHS 402 using the capability message including the capability data. Thus, the offer messages sent at block 306 of the method 300 may include offer messages 410a, 410b, and 410c that each include configuration data, which are portions of the configuration message, provided in DHCP options.

Thus, in an example, the DHCP server 406 may create each of a first packet and subsequent packets that include sequence information ("x of y") that indicates the sequence of that packet, the configuration data, and/or any other information similar to that included in the discover messages discussed above. As discussed above, the configuration message including configuration data determined from the capability data may provide for a complete configuration of the client IHS 402 (i.e., rather than providing for the configuration of a single NIC interface that has conventionally be provided using DHCP communications.) For example, a configuration message for the client IHS 402 may include the following configuration data (provided in Extensible Markup Language (XML)):

```
<cfg:personaConfiguration
xmlns:cfg="http://schemas.scalent.com/mi/config/persona"
cfg:version="2345286"
cfg:forceUpdate="false"
cfg:lanMonitor="-1"
cfg:name="WIN2k8sp2-HWISCSI"
cfg:scnServicesIp="10.20.35.20"
cfg:scnNetwork="10.20.36.0"
cfg:scnSubnetMask="255.255.252.0"
cfg:scnGateway="10.20.36.1"
cfg:scnPrimaryChannelId="1"
cfg:scnSecondaryChannelId="2"
cfg:controllerPort="2867"
cfg:bladeId="54Z6NF1"
cfg:appId="PR.436774.0"
cfg:instance="1"
cfg:bladeName="Server-4"
cfg:vApplianceName="WIN2k8sp2-HWISCSI"
cfg:netBootServer="10.20.100.16"
cfg:routingAndDNS="managed"
cfg:networkingEnabled="false"
cfg:extensionsEnabled="false"
cfg:healthMonitorEnabled="true"
cfg:osFamily="windows"
cfg:bootType="hwiscsi"
cfg:imagePath="hwiscsi|broadcom|netapp|10.20.100.16|3260|6|iqn.1986-03.com.ibm:sn.101181095|iqn.1995-05.com.broadcom.iscsiboot99|0|hwiscsi"
cfg:networkMode="trunk">
<cfg:nics>
<cfg:nic cfg:channelId="1"
cfg:macAddress="00-1E-4F-23-B2-2C"
cfg:role="boot">
<cfg:ipAddresses>
<cfg:ipAddress
cfg:address="10.20.36.112"
cfg:subnetMask="255.255.252.0"
cfg virtual="false" />
</cfg:ipAddresses>
</cfg:nic>
<cfg:nic cfg:channelId="2"
cfg:macAddress="00-1E-4F-23-B2-2E"
cfg:role="boot">
<cfg:ipAddresses>
<cfg:ipAddress
cfg:address="10.20.36.113"
cfg:subnetMask="255.255.252.0"
cfg virtual="false" />
</cfg:ipAddresses>
</cfg:nic>
</cfg:nics>
<cfg:vNics />
<cfg:routes />
<cfg:dnsAddresses />
<cfg:extensions />
<cfg:properties />
<cfg:assignedTags />
<cfg:nicMappings>
<cfg:nicMapping cfg:type="SCN"
cfg:vNicId="primary"
cfg:macAddress="00-1E-4F-23-B2-2C" />
<cfg:nicMapping
cfg:type="SCN"
cfg:vNicId="secondary"
cfg:macAddress="00-1E-4F-23-B2-2E" />
</cfg:nicMappings>
</cfg:personaConfiguration>
```

As discussed above, the discover messages and offer messages may include compressed and encrypted capability data and configuration data, respectively. For example, the client IHS 402 may have access to a public key of the controller 404, and the client IHS 402 may generate a secret symmetric key prior to sending the discover messages though the tunnel in the DHCP server 406. That secret symmetric key may be encrypted with the public key of the controller 404, and the capability data may be encrypted with the secret symmetric key. Upon receipt of the discover messages, the DHCP server 406 may then use a private key of the controller 404 to decrypt the secret symmetric key, and then use the secret symmetric key to decrypt the capability data. The controller 404 and DHCP server 406 may encrypt the configuration data and the client IHS 402 may decrypt the configuration data in a similar manner. However, other cryptographic techniques may be utilized to secure the capability data, configuration data, and/or any other communications using the system. Furthermore, the visible fields in the legacy DHCP header may be omitted for increased security (while DHCP reserves space for the conventional network configuration information in the DHCP packet header, in an embodiment of the present disclosure, that information is not used for the DHCP communication configuration system.)

As also discussed above, DHCP configuration system may provide for authentication. In such an embodiment, the client IHS 402 may have access to a public key of the controller 404, and the controller may have the public keys of all of the DHCP clients in the client IHS 402. Each DHCP client may generate a secret symmetric key that is encrypted with the public key of the controller 404, and the capability data may be encrypted with the secret symmetric key and then signed with a private key of the DHCP clients. Upon receipt of the discover messages, the DHCP server 406 may then authenticate the message using the public key of the DHCP client, and use a private key of the controller 404 to decrypt the secret symmetric key, and then use the secret symmetric key to decrypt the capability data. The controller 404 and DHCP server 406 may encrypt the configuration data with the secret key and sign it with the private key of the controller 404. The DHCP client in the client IHS 402 may authenticate the message with the controllers public key and decrypt the configuration data with the secret key. However, other authentication techniques may be utilized to secure the capability data, configuration data, and/or any other communications using the system.

The DHCP server 406 in the controller 404 then sends the offer messages 410a, 410b, and 410c to the client IHS 402 over the network, and the method 300 proceeds to decision block 306 where it is determined whether the client IHS has received all of the offer messages sent by the controller at block 306. As discussed above, each of the offer messages sent in block 306 of the method 300 includes sequence information that identifies that offer message and the total number of offer messages being sent (e.g., the first offer message 410a could include sequence information "1 of 4", the second offer message 410b could include sequence information "2 of 4", and so on.) Thus, the client IHS 402 may determine whether all of the offer messages have been received by checking whether each offer message in the sequence has been received.

If at decision block 308 it is determined that all of the offer messages have been received, the method 300 proceeds to block 310 where the client IHS 402 sends a request message. In an embodiment, the client IHS 402 sends the request message 412 that includes a mask, discussed in further detail below, that indicates to the controller 404 that the client IHS 402 has received all of the offer messages including the configuration data. However, one of skill in the art will recognize that following receipt of all of the offer messages, the client IHS 402 has all the configuration data necessary to configure the IHS 402, and that block 310 and the sending of the request message 412 may be omitted or sent simply to conform to traditional DHCP communications.

The method 300 then proceeds to block 312 where the controller 404 sends an acknowledge message. In an embodiment, the controller 404 sends the acknowledge message 414 to the client IHS 402. However, one of skill in the art will recognize that following receipt of all of the offer messages, the client IHS 402 has all the configuration data necessary to configure the IHS 402, and that block 312 and the sending of the acknowledge message 414 may be omitted or sent simply to conform to traditional DHCP communications. Thus, either immediately following the determination that the client IHS 402 has received all of the offer messages at decision block 308, or upon receiving the acknowledge message 414, the client IHS 402 may stop any modified DHCP clients that are running, construct the configuration message from the configuration data, and/or apply the configuration data received in the offer messages at block 306 in order to completely configure the client IHS 402.

Thus, a modified DHCP client may be started on each NIC in the system, and each of those modified DHCP clients will simultaneously and independently try to retrieve a configuration using the capability data. When one of the DHCP clients receives all of the configuration data, all of the other DHCP clients in the system may be terminated and any network activity quiesced such that the configuration data may be used to configure the system. Prior to one of the DHCP clients receiving all of the configuration data, no configuration changes have been performed, as the eventual configuration data received by the client IHS 402 may contain a list of resources whose configuration should not be modified. For example, the client IHS 402 may have four NICs, two of which should be configured by the controller 404, and two of which should not be configured (e.g., because they are connected to resources that are not managed by the controller 404, used for different purposes such as storage, etc.) Prior to configuration, the client IHS 402 has no way of knowing which NICs are which. Traditionally, conventional DHCP communications would simply use DHCP to apply a network configuration to each NIC in the client IHS 402. Upon achieving connectivity, the client IHS 402 would then receive its entire configuration and discover that NICs that should not have been configured have already been configured. Such a situation is not encountered in the systems and method of the present disclosure, as the modified DHCP client in the client IHS 402 will wait for its entire configuration prior to making any configuration changes.

As discussed above, there may be situations where discover messages are not received by the DHCP server 406 in the controller 404 and/or offer messages are not received by the client IHS 402. FIG. 5 illustrates a system 500 that is substantially similar to the system 400 discussed above with reference to FIG. 4, but in which the DHCP server 406 in the controller 404 was determined to have not received all of the discover messages at decision block 304 and the client IHS 402 was determined to have not received all of the offer messages at decision block 308. Thus, the client IHS 402, the DHCP server 406, and the controller 404 in the system 500 may operate substantially as described above with reference to blocks 302, 304, 306, 308, 310 and 312.

However, if it is determined that the DHCP server 406 in the controller 404 has not received all of the discover messages at decision block 304, the method 300 proceeds to block 314 where the DHCP server 406 in the controller 404 sends an offer message indicating which discover message the DHCP server 406 has yet to receive. Upon receipt of a discover message including capability data, the DHCP server 406 may send the offer message indicating which discover message(s) the controller 404 has yet to receive in response to having not received all of the discover messages in the sequence and a predetermined time interval passing without receiving a discover message including capability data. As discussed above, each of the discover messages sent in block 302 of the method 300 includes sequence information that identifies that discover message and the total number of discover messages being sent (e.g., the first discover message 408*a* could include sequence information "1 of 3", the second discover message 408*b* could include sequence information "2 of 3", and so on.) Thus, the DHCP server 406 may determine that one or more of the discover messages have not been received by checking whether each discover message in the sequence has been received. At block 314, the DHCP server 406 may then create an offer message including a mask that indicates which of the discover messages the DHCP server 406 has yet to receive (e.g., the mask may include a vector of bits that indicates which packets have been received), and send that offer message over the network to the client IHS 402. As discussed above, because DHCP is a broadcast UDP, fragmentation of large packets is problematic due to the resending of all the fragments to every host in the broadcast domain when one fragment is missed. The system of the present disclosure solves this problem by constraining packets to be smaller than the MTU of the network, and then using masks to request the resending of just the packets that were missed.

In the example illustrated in FIG. 5, the DHCP server 406 in the controller 404 has determined that one or more of the discover messages sent in block 302 were not received, and created and sent an offer message containing a mask 502 indicating the discover messages that were missed. In response, the client IHS 402 resends the discover messages including the capability data 512 that were indicated as not received by the mask (i.e., if the mask 502 indicates that discover message "2 of 3" and "3 of 3" were missed, the client IHS 402 will resend those discover messages to the DHCP server 406 in the controller 404.) The method 300 then returns to decision block 304 to determine whether the DHCP server 406 in the controller 404 has received all the discover messages. Thus, if the discover message(s) including the capability data 512 that the mask 502 indicated were not received are then received following block 314, the method 300 will return to decision block 304 and then proceed to block 306 as discussed above. If the discover messages including the capability data 512 that the mask 502 indicated were not received are again not received following block 314, the method 300 will loop until all the discovery messages have been received.

Similarly, if it is determined that the client IHS 402 has not received all of the offer messages at decision block 308, the method 300 proceeds to block 306 where the client IHS 402 sends a request message indicating which offers message the client IHS 402 has yet to receive. Upon receipt of an offer message including configuration data, the client IHS 402 may send the request message indicating which offer message(s) the client IHS 402 has yet to receive in response to having not received all of the offer messages in the sequence and a predetermined time interval passing without receiving an offer message including capability data. As discussed above, each of the offer messages sent in block 306 of the method 300 includes sequence information that identifies that offer message and the total number of offer messages being sent (e.g., the first offer message 410*a* could include sequence information "1 of 4", the second offer message 410*b* could include sequence information "2 of 4", and so on.) Thus, the client IHS 402 may determine that one or more of the offer messages have not been received by checking whether each offer message in the sequence has been received. At block 316, the client IHS 402 may then create a request message including a mask that indicates which of the offer messages the client IHS 402 has yet to receive (e.g., the mask may include a vector of bits that indicates which packets have been received), and send the discover message to the DHCP server 406 in the controller 404. As discussed above, because DHCP is a UDP broadcast protocol, fragmentation of large packets is problematic due to the resending of all the fragments to every host in the broadcast domain when one fragment is missed. The system of the present disclosure solves this problem by constraining packets to be smaller than the MTU of the network, and then using masks to request the resending of just the packets that were missed.

In the example illustrated in FIG. 5, the client IHS 402 has determined that one or more of the offer messages sent in block 306 were not received, and creates and sends an request message including a mask 514 indicating the offer messages that were missed. In response, the DHCP server 406 in the controller 404 resends the offer messages including the configuration data 516 that were indicated as not received by the mask (i.e., if the mask 514 indicates that offer message "2 of 4" was missed, the DHCP server 406 in the controller 404 will resend that offer message to the client IHS 402.) The method 300 then returns to decision block 308 to determine whether the client IHS 402 has received all the offer messages. Thus, if the offer messages including the configuration data 516 that the mask 514 indicated were not received are then received by the client IHS 402 following block 316, the method 300 will return to decision block 308 and then proceed to block 310 as discussed above. If the offer messages including the configuration data 516 that the mask 502 indicated were not received are again not received by the client IHS 402 following block 314, the method 300 will loop until all the offer messages have been received.

Thus, systems and methods have been described that utilize DHCP communications to securely send capability data completely describing a client IHS to a controller, and then send configuration data determined using the capability data to the client IHS from the controller in order to allow the client IHS to completely configure itself. In the event a DHCP packet is not received by the client IHS or the controller, the system and method provide for the resending of only the missed DHCP packets in order to prevent the negative network traffic consequences associated with the conventional DHCP communications resending of all fragments when a fragment is missed. While the embodiments described above are directed to the sending and receiving of capability and configuration data to allow for the complete configuration of a client IHS, one of skill in the art will recognize that the systems and methods described herein may be used to generally send a variety of information in any sequence and sequence length using DHCP communications.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Dynamic Host Configuration Protocol (DHCP) communications configuration system, comprising
   a network;
   a client system that is coupled to the network and that includes a plurality of hardware resources, wherein the plurality of hardware resources include:
      one or more client system processors; and
      a client system non-transitory, computer-readable medium having instructions that, when executed by the one or more client system processors, cause the one or more client system processors to:
         send hardware capability information over the network that provides for a determination of configuration data for the plurality of hardware resources in the client system; and
   a controller that is coupled to the network and includes:
      one or more controller processors; and
      a controller non-transitory, computer-readable medium having instructions that, when executed by the one or more controller processors, cause the one or more controller processors to:
         receive the hardware capability information from the client system, wherein the hardware capability information is distributed across a plurality of DHCP discover messages and included in DHCP options in each of the plurality of DHCP discover messages;
         use the hardware capability information to determine configuration data for the client system, distribute the configuration data across a plurality of DHCP offer messages; and
         send the plurality of DHCP offer messages over the network to the client system,
      wherein the client system is configured to receive the plurality of DHCP offer messages including the configuration data, retrieve the configuration data distributed across the plurality of DHCP offer messages, and apply the configuration data retrieved from the plurality of DHCP offer messages to one or more subsystems in the client system in order to configure each of the plurality of hardware resources in the client system following the receiving of the final DHCP offer message and prior to either providing a DHCP request message or receiving a DHCP acknowledge message.

2. The system of claim 1, wherein the client system sending the hardware capability information over the network includes:
   distributing hardware capability data that describes the plurality of hardware resources on the client system across a plurality of DHCP discover messages; and
   sending the plurality of DHCP discover messages over the network to the controller, wherein the controller is configured to retrieve the hardware capability data distributed across the plurality of DHCP discover messages in the DHCP options and process the hardware capability data to determine the configuration data.

3. The system of claim 2, wherein the controller is configured to:
   determine that at least one of the plurality of DHCP discover messages sent by the client system was not received and, in response, send a DHCP offer message requesting the at least one of the plurality of DHCP discover messages that was not received.

4. The system of claim 3, wherein the controller sending the plurality of DHCP offer messages that include the configuration data for the client system is performed subsequent to determining that all of the plurality of DHCP discover messages sent by the client system were received.

5. The system of claim 2, wherein the client system is configured, for each of the plurality of DHCP discover messages, to:
   generate a key;
   encrypt the hardware capability data in each of the plurality to DHCP discover messages with the generated key; and
   encrypt the generated key with a public key of the controller,
      wherein the controller is configured to decrypt the generated key with a private key and use the decrypted generated key to decrypt the hardware capability data in the DHCP discover message.

6. The system of claim 1, wherein the client system is configured to:
   determine that at least one of the plurality of DHCP offer messages sent by the controller was not received by the client system and, in response, send a DHCP request message requesting the at least one of the plurality of DHCP offer messages that was not received by the client system.

7. The system of claim 6, wherein the using the configuration data to configure each of the plurality of hardware resources in the client system is performed upon determining that all of the plurality of DHCP offer messages sent by the controller were received by the client system.

8. An information handling system (IHS), comprising:
   a processor;
   a plurality of network devices coupled to the processor and a network; and
   a non-transitory, computer-readable medium coupled to the processor and including instruction that when executed by the processor cause the processor to:
      send hardware capability information in a plurality of DHCP discover messages over the network to a controller, wherein the hardware capability information is distributed in DHCP options included in the plurality of DHCP discover messages and provides for a determination of configuration data for each of the plurality of network devices;
      receive a plurality of DHCP offer messages from the controller through the network, wherein configuration data is distributed across the plurality of DHCP offer messages;
      retrieve the configuration data distributed across the plurality of DHCP offer messages; and
      apply the configuration data retrieved from the plurality of DHCP offer messages to one or more subsystems in the IHS in order to configure each of the plurality of network devices following the receiving of the final DHCP offer message and prior to either providing a DHCP request message or receiving a DHCP acknowledge message.

9. The IHS of claim 8, wherein the non-transitory, computer-readable medium further includes instruction that when executed by the processor cause the processor to: resend at least one of the plurality of DHCP discover messages that was previously sent in response to receiving a DHCP offer message over the network from the controller, wherein the DHCP offer message requests the at least one of the plurality of DHCP discover messages that was previously sent but not received by the controller.

10. The IHS of claim 8, wherein the non-transitory, computer-readable medium further includes instruction that when executed by the processor cause the processor to: generate a key; encrypt the hardware capability data in each of the plurality of DHCP discover messages with the generated key; and encrypt the generated key with a public key of the controller.

11. The IHS of claim 8, wherein the hardware capability data is stored in a vendor specific information option in each of the plurality of DHCP discover messages.

12. The IHS of claim 8, wherein the using the configuration data to configure the IHS is performed upon determining that all of the plurality of DHCP offer messages sent by the controller were received.

13. The IHS of claim 8, wherein the non-transitory, computer-readable medium further includes instruction that when executed by the processor cause the processor to:
   determine that at least one of the plurality of DHCP offer messages sent by the controller was not received and, in response, send a DHCP request message requesting the at least one of the plurality of DHCP offer messages that was not received.

14. A method for configuring an IHS, comprising:
   sending, by a client system, hardware capability information in a plurality of DHCP discover messages over a network to a controller, wherein the hardware capability information is distributed in DHCP options included in the plurality of DHCP discover messages, and wherein the hardware capability information provides for a determination of configuration data for each of a plurality of hardware resources in the client system;
   receiving, by the controller, the hardware capability information through the network;
   using, by the controller, the hardware capability information to determine configuration data for each of the plurality of hardware resources in the client system, distributing the configuration data across a plurality of DHCP offer messages, and sending the plurality of DHCP offer messages over the network to the client system;
   receiving, by the client system, the plurality of DHCP offer messages and retrieving the configuration data distributed across the plurality of DHCP offer messages; and
   applying, by the client system, the configuration data retrieved from the plurality of DHCP offer messages to one or more subsystems in the client system in order to configure each of the plurality of hardware resources in the client system following the receiving of the final DHCP offer message and prior to either providing a DHCP request message or receiving a DHCP acknowledge message.

15. The method of claim 14, further comprising: determining, by the controller, that at least one of the plurality of DHCP discover messages sent by the client system was not received and, in response, sending a DHCP offer message to the client system requesting the at least one of the plurality of DHCP discover messages that was not received by the controller.

16. The method of claim 15, wherein the sending the plurality of DHCP offer messages that include the configuration data for the IHS is performed subsequent to determining that all of the plurality of DHCP discover messages sent by the IHS were received by the controller.

17. The method of claim 14, further comprising:
   determining, by the client system, that at least one of the plurality of DHCP offer messages sent by the controller was not received and, in response, sending a DHCP request message to the controller requesting the at least one of the plurality of DHCP offer messages that was not received by the client system.

18. The method of claim 17, wherein the using the configuration data to configure each of the plurality of hardware resources in the client system is performed upon determining that all of the plurality of DHCP offer messages sent by the controller were received by the client system.

* * * * *